Jan. 13, 1953  C. H. HUGGINS  2,625,370
SPADING FORK
Filed July 19, 1951

INVENTOR
Clifford H. Huggins
BY Shoemaker & Mattare
ATTORNEYS

Patented Jan. 13, 1953

2,625,370

UNITED STATES PATENT OFFICE 2,625,370

SPADING FORK

Clifford H. Huggins, Wichita Falls, Tex., assignor of one-third to W. C. Gowan, Dallas, Tex.

Application July 19, 1951, Serial No. 237,525

5 Claims. (Cl. 254—131.5)

This invention relates to improvements in spading forks.

The invention broadly comprehends a spading fork having a central tine fixedly secured to the handle shaft and a member pivotally connected with the handle shaft and having two groups of tines thereon disposed at opposite sides of the central tine, and there being a pedal rigid with the pivotally mounted member so that by downward pressure by the foot of the operator on the pedal, the group of tines on the pivoted member will be swung forwardly to throw out the earth.

An object of the invention is to provide an improved spading fork of the general character referred to that will be of simple, practical construction, that can be easily operated and will efficiently perform the spading operation.

Another object of the invention is to provide in a spading fork of the kind mentioned an improved mounting for the movable tines and in which the pedal for operating the movable member and tines will be disposed for more convenient engagement by the foot of the operator.

A further object of the invention is to provide in a spading fork of the general construction referred to an adjustable gage device of simple, efficient construction, easily applied and adjusted, for limiting the depth of insertion of the tines into the ground and providing for uniformity in the spading operation.

The invention, with other objects and advantages thereof, and the particular construction, combination and arrangement of parts comprising the same will be understood from the following detailed description when considered in connection with the accompanying drawing forming part hereof and illustrating one embodiment of the invention.

Figure 1:
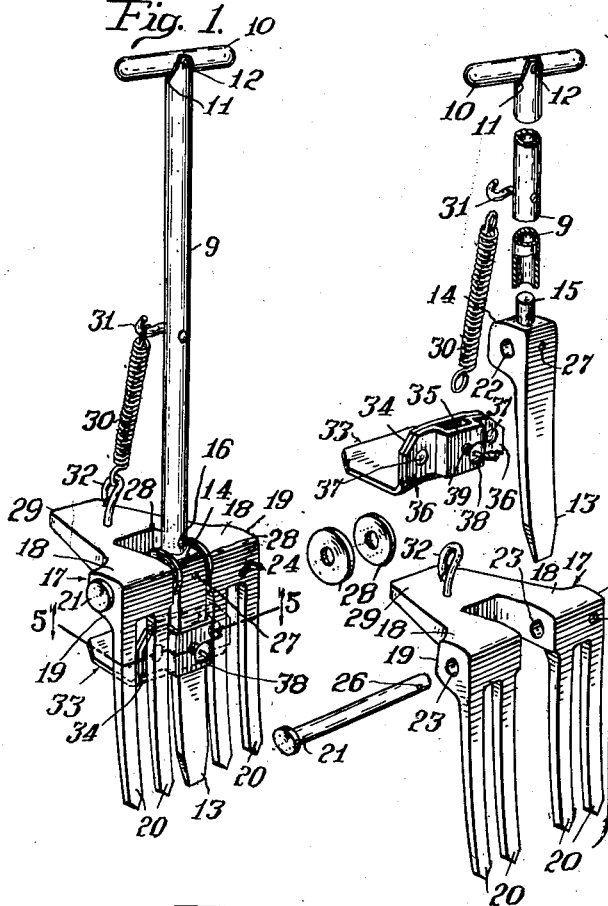
Fig. 1 is a front perspective view of a spading fork constructed in accordance with the present invention, the movable tines being shown extending parallel with the fixed central tine in normal position to be forced into the ground at the beginning of the spading operation.

While a preferred embodiment of the invention is illustrated in the drawing, it wil be understood that minor changes and modifications may be made in the particular construction shown, and the invention may be embodied in other forms as will appeal to those skilled in the art and falling within the scope of the appended claims, without departing from the spirit of the invention.

Referring to a detailed description of the particular embodiment of the invention illustrated in the drawing, the construction shown includes a shaft 9 having a handle 10 on the upper end thereof, the shaft being shown formed of a length of metal tubing and being provided with a recess 11 in its upper end in which the handle 10 is fitted and secured by a rivet 12. Extending longitudinally from the lower end of the shaft 9 and fixedly secured thereto is a tine 13. The tine 13 has at its upper end an enlarged head 14 with a cylindrical shank 15 extending from the upper side thereof, the shank snugly fitting into the lower end of the shaft 9 and being secured thereto by a rivet 16.

Pivotally connected with the lower end of the shaft 9 is a member generally designated 17 and comprising a substantially U-shaped yoke portion 18 that has at the ends thereof enlarged heads 19 to each of which are rigidly secured groups of tines 20, said tines extending downwardly from said heads at substantially a right angle to the yoke portion 18. The yoke portion 18 is disposed at the rear side of the fixed tine 13, the yoke straddling the head 14 of the tine 13 with its heads 19 positioned at opposite sides of and in transverse alignment with the head 14 of the tine 13. The yoke portion 18 is pivotally connected with the head 14 of the tine 13 by a pivot bolt 21 extending through apertures or bores 22 and 23 in the head 14 and heads 19 respectively, the pivot bolt being secured to one of the heads 19 of the yoke portion 18 by a cotter pin 24 extending through apertures 25 therein and an aperture 26 in the outer end portion of the pivot bolt 21. 27 designates an oil hole in the wall of the head 14 leading to the interior of the bore or aperture 23 therein, and 28 are washers on the pivot bolt interposed between the end faces of the head 14 of the fixed tine 13 and the inner end faces of the heads 19 of the yoke portion. In the particular construction shown in the drawing, there are two tines 20 on each head 19 of the yoke portion, these tines being of less width than the fixed central tine 13.

Integral with the yoke portion 18 and extending rearwardly from the rear end thereof at substantially a right angle to the tines 20, is a pedal 29 by which the yoke portion may be rocked to swing the tines 20 forwardly and upwardly relative to the fixed tine 13. Suitable means hereinafter described is provided for limiting the rocking movement of the yoke portion 18 in one direction and supporting the same with its tines 20 in the position shown in Fig. 1 extending substantially parallel with the tine 13. The yoke portion 18 and tines 20 are yieldingly maintained in this position by tension spring 30 connected at one end to an eye 31 on the handle shaft 9 and at its other end to an eye 32 on the yoke portion 18.

A gage device is provided for limiting the depth of insertion of the tines 13 and 20 into the ground and whereby a plot of ground may be uniformly spaded to the depth desired. The gage device comprises a main plate part 33 of general rectangular shape and a plate portion 34 extending at a substantially right angle from the inner edge of said main plate part. In the construction shown, the plate portion 34 is integral with the main plate part 33, said parts being formed from a single piece of sheet metal bent along a line intermediate its side edges. 35 designates a U-shaped member having flanges 36 extending outwardly from the ends of the side portions thereof, said flanges fitting against and being secured by rivets 37 to the plate portion 34. The U-shaped member 35, as shown, forms with the plate portion 34 a loop or sleeve that slidably fits on the central tine 13, said plate portion extending transversely of and fitting against the rear face of the tine 13, the plate portion having a slight concave curvature at its front side conforming to the rear face of the central tine. The main plate part 33 extends rearwardly from the rear side of the tine 13 at substantially a right angle thereto, the same being adapted to engage the ground as shown in Fig. 2 of the drawing. The U-shaped member 35 is clamped to the central tine 13 by a set screw 38 engaging a threaded aperture 39 in the intermediate portion of the U-shaped member with its outer end bearing against the front face of the tine 13, this construction providing for the easy mounting of the gage device on the tine 13 and for the ready adjustment of the main plate part 33 to different positions along the tine 13 to regulate the depth of insertion of the tines 13 and 20 as desired. It will be noted that the plate portion 34 extends back of two of the tines 20 and, in addition to forming part of the gage device, constitutes the means hereinbefore mentioned for limiting the rocking movement of the yoke portion 18 and supporting the tines 20 in the position shown in Fig. 1 extending substantially parallel with the central tine 13.

Figure 2:
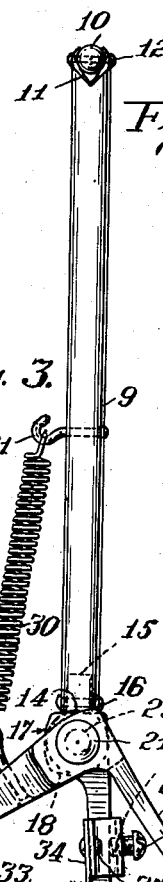
Fig. 2 is a side elevation illustrating the position of the parts after the fork has been inserted into the ground and the pedal has been pressed downwardly and the group of movable tines swung forwardly partially through its upward sweep to expel the earth.
Figure 3:
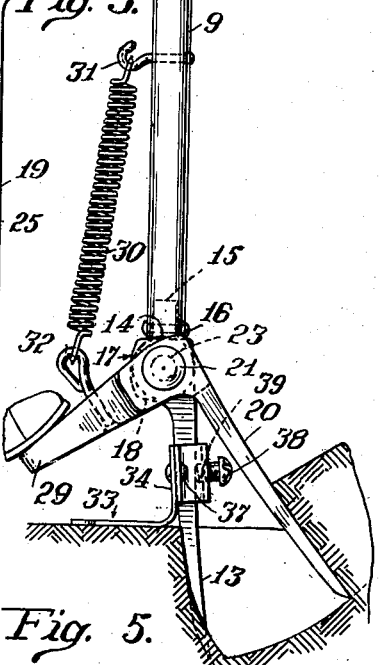
Fig. 3 is an exploded perspective view.
Figure 4:
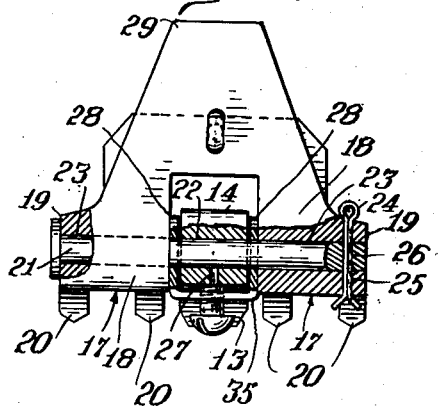
Fig. 4 is a detail top plan view of the yoke member and central tine with parts shown in section.
Figure 5:
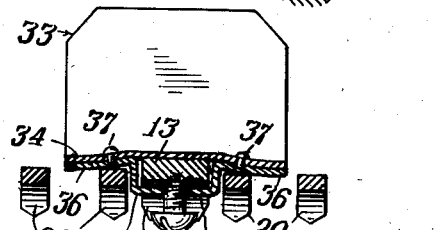
Fig. 5 is a transverse section on the line 5—5 of Fig. 1.

In the use of the device, the fork is held with the tines 13 and 20 nearly perpendicular as shown in Fig. 1 and the tines are forced downwardly into the ground by downward pressure of the foot of the operator on the upper side of one of the heads 19 of the yoke portion, the tines being inserted into the ground until the main plate part 33 of the depth gage engages the surface of the ground as illustrated in Fig. 2 of the drawing. The pedal 29 is then pressed downwardly by the foot of the operator, the yoke portion 29 being thus rocked and the tines 20 being swung forwardly and upwardly to throw or flip out the earth, the spading operation being easily effected and the fork being operated by the foot and leg of the operator rather than by the operator's back. As will be understood, after each forward earth expelling movement of the tines 20, upon removal of downward pressure upon the pedal 29, said tines are returned to the position shown in Fig. 1 ready for another operation.

What I claim is:

1. A spading fork including a shaft, a handle on the upper end of the shaft, a tine extending longitudinally from the lower end of the shaft fixedly secured thereto, a member comprising a substantially U-shaped yoke portion having tines rigidly secured to and extending from the ends thereof at substantially a right angle thereto, said yoke portion being disposed at the rear side of the first mentioned tine with its end portions positioned on opposite sides of and in transverse alignment with the upper end of the first mentioned tine and pivotally connected thereto for swinging movement, a pedal integral with the yoke portion extending rearwardly therefrom at substantially a right angle to the tines on the yoke portion and by which the yoke may be rocked to swing its tines upwardly relative to the first mentioned tine, stop means to limit the rocking movement of the yoke portion in one direction and to support the same with its tines extending substantially parallel with the first mentioned tine, and a tension spring connected at one end to the shaft and at its other end to said yoke portion, said spring acting to yieldably maintain the yoke portion in position supported by said stop means with the tines of the yoke portion extending substantially parallel with the first mentioned tine.

2. A spading fork including a shaft, a handle on the upper end of the shaft, a tine extending longitudinally from the lower end of the shaft fixedly secured thereto, said tine having an enlarged apertured head at its upper end, a member comprising a substantially U-shaped yoke portion having enlarged transversely extending apertured heads at its outer ends, and tines rigidly secured to and extending downwardly from said heads at substantially a right angle to the yoke portion, said yoke portion being disposed at the rear side of the first mentioned tine with its enlarged heads positioned at opposite sides of and in transverse alignment with the enlarged head of the first mentioned tine, a pivot bolt engaging the apertures in the head of the first mentioned tine and the apertures in the head of the yoke portion and connecting the latter to the first mentioned tine for swinging movement, a pedal integral with the yoke portion and extending rearwardly therefrom at substantially a right angle to the tines on the yoke portion and by which the yoke portion may be rocked to swing its tines upwardly relative to the first mentioned tine, stop means to limit the rocking movement of the yoke portion in one direction and to support the same with its tines extending substantially parallel with the first mentioned tine, and a tension spring connected at one end to the shaft and at its other end to the yoke portion, said spring acting to yieldably maintain the yoke portion in position supported by said stop means with the tines of the yoke portion extending substantially parallel with the first mentioned tine.

3. A spading fork including a shaft, a handle on the upper end of the shaft, a tine extending longitudinally from the lower end of the shaft fixedly secured thereto, a member comprising a substantially U-shaped yoke portion having tines rigidly secured to and extending from the ends thereof at substantially a right angle thereto, said yoke portion being disposed at the rear side of the first mentioned tine with its end portions positioned on opposite sides of and in transverse alignment with the upper end of the first mentioned tine and pivotally connected thereto for swinging movement, a pedal integral with the yoke portion extending rearwardly therefrom at substantially a right angle to the tines on the yoke portion and by which the yoke may be rocked to swing its tines upwardly relative to the first mentioned tine, stop means on said first mentioned tine for engaging the under side of tines on said yoke portion to limit the rocking movement of the yoke portion in one direction and support the tines on the yoke portion extending substantially parallel with the first mentioned tine, and a tension spring connected at one end to the shaft and at its other end to said yoke portion, said spring acting to yieldably maintain the yoke portion with the tines thereon engaging said stop means and with the tines of the yoke portion extending substantially parallel with the first mentioned tine.

4. A spading fork including a shaft, a handle on the upper end of the shaft, a tine extending longitudinally from the lower end of the shaft fixedly secured thereto, a member comprising a substantially U-shaped yoke portion having tines rigidly secured to and extending from the ends thereof at substantially a right angle thereto, said yoke portion being disposed at the rear side of the first mentioned tine with its end portions positioned on opposite sides of and in transverse alignment with the upper end of the first mentioned tine and pivotally connected thereto for swinging movement, a pedal integral with the yoke portion extending rearwardly therefrom at substantially a right angle to the tines on the yoke portion and by which the yoke may be rocked to swing its tines upwardly relative to the first mentioned tine, a gauge device including a plate mounted on said first mentioned tine for longitudinal adjustment and adapted to engage the ground to limit the depth of penetration of the tines into the ground, said gauge plate being disposed at the rear side of the first mentioned tine and extending transversely at substantially a right angle thereto, and means for clamping the gauge plate in different positions of adjustment along the first mentioned tine, said gauge device having a part to limit the swinging movement of the tines of the yoke portion in one direction and to support said last mentioned tines extending substantially parallel with the first mentioned tine, and a tension spring connected at one end to the shaft and at its other end to said yoke portion, said spring acting to yieldably maintain the yoke portion in position with its tines supported by said part of the gauge device extending substantially parallel with the first mentioned tine.

5. A spading fork including a shaft, a handle on the upper end of the shaft, a tine extending longitudinally from the lower end of the shaft fixedly secured thereto, a member comprising a substantially U-shaped yoke portion having tines rigidly secured to and extending from the ends thereof at substantially a right angle thereto, said yoke portion being disposed at the rear side of the first mentioned tine with its end portions positioned on opposite sides of and in transverse alignment with the upper end of the first mentioned tine and pivotally connected thereto for swinging movement, a pedal integral with the yoke portion extending rearwardly therefrom at substantially a right angle to the tines on the yoke portion and by which the yoke may be rocked to swing its tines upwardly relative to the first mentioned tine, a gauge plate mounted on said first mentioned tine for longitudinal adjustment and adapted to engage the ground to limit the depth of penetration of the tines into the ground, said gauge plate having a loop member secured thereto slidably engaging the first mentioned tine, and a set screw engaging a threaded aperture in a wall of the loop member with its outer end bearing against the first mentioned tine and clamping said loop thereto, said gauge device having a part to limit the swinging movement of the tines of the yoke portion in one direction and to support said last mentioned tines extending substantially parallel with the first mentioned tine, and a tension spring connected at one end to the shaft and at its other end to said yoke portion, said spring acting to yieldably maintain the yoke portion in position with its tines supported by said part on the gauge device extending substantially parallel with the first mentioned tine.

CLIFFORD H. HUGGINS.

REFERENCES CITED

The following references are of record in the file of this patent:

UNITED STATES PATENTS

| Number | Name | Date |
|---|---|---|
| 54,711 | Frohock | May 15, 1866 |
| 175,528 | Trussell | Mar. 28, 1876 |
| 622,970 | McDonald | Apr. 11, 1899 |
| 971,863 | Schlarf | Oct. 4, 1910 |
| 1,778,701 | Williams | Oct. 14, 1930 |
| 2,497,771 | Hirst | Feb. 14, 1950 |